(12) United States Patent
Gray, Jr.

(10) Patent No.: US 7,456,509 B2
(45) Date of Patent: Nov. 25, 2008

(54) METHODS OF OPERATING A SERIES HYBRID VEHICLE

(75) Inventor: Charles L. Gray, Jr., Pinckney, MI (US)

(73) Assignee: The United States of America as represented by the Administrator of the U.S. Environmental Protection Agency, Washington, DC (US)

(*) Notice: Subject to any disclaimer, the term of this patent is extended or adjusted under 35 U.S.C. 154(b) by 45 days.

(21) Appl. No.: 11/058,378

(22) Filed: Feb. 14, 2005

(65) Prior Publication Data

US 2005/0145425 A1    Jul. 7, 2005

Related U.S. Application Data

(62) Division of application No. 10/672,732, filed on Sep. 25, 2003, now Pat. No. 6,876,098.

(51) Int. Cl.
*F02D 29/06* (2006.01)
(52) U.S. Cl. ............ 290/40 C; 290/29; 290/40 R; 290/40 B; 290/34; 180/65.2
(58) Field of Classification Search ........... 290/40 C, 290/29, 40 R, 40 B, 34; 180/65.2, 65.3, 65.1
See application file for complete search history.

(56) References Cited

U.S. PATENT DOCUMENTS

| | | | |
|---|---|---|---|
| 3,842,287 A | 10/1974 | Nakamura | 290/16 |
| 4,335,429 A | 6/1982 | Kawakatsu | 364/424 |
| 4,351,405 A | 9/1982 | Fields et al. | 180/65 A |
| 4,363,999 A | 12/1982 | Preikschat | 318/53 |
| 4,407,132 A | 10/1983 | Kawakatsu et al. | 60/716 |
| 4,547,678 A | 10/1985 | Metzner et al. | 290/40 C |
| 4,908,553 A | 3/1990 | Hoppie et al. | 318/382 |
| 5,081,365 A | 1/1992 | Field et al. | 290/45 |
| 5,176,213 A | 1/1993 | Kawai et al. | 180/243 |

(Continued)

FOREIGN PATENT DOCUMENTS

EP    0 543 390 B1    5/1993

(Continued)

*Primary Examiner*—Darren Schuberg
*Assistant Examiner*—Iraj A. Mohandesi
(74) *Attorney, Agent, or Firm*—Seed Intellectual Property Law Group PLLC

(57) ABSTRACT

The invention is directed toward methods for operating a series hybrid vehicle in a manner that responds to the operator's demand for power output, while maximizing engine efficiency and minimizing disruptions in vehicle drivability. According to principles of the present invention, when the driver of a series hybrid vehicle makes a demand for power output, whether the secondary power source(s) is supplied with secondary energy stored in an energy storage device(s), direct input energy generated by an engine(s), or both, depends on the amount of available secondary energy stored in the vehicle's secondary storage device(s) alone, and in combination with vehicle speed. During the time that the engine is used to generate secondary energy, the power efficiency level at which the engine is operated also depends on the vehicle speed and the amount of available secondary energy stored in the vehicle's secondary storage device alone, and in combination with vehicle speed. Further, in some embodiments, when the engine is not generating secondary energy, the engine is selectively turned off or idled in response to various operating conditions.

24 Claims, 7 Drawing Sheets

U.S. PATENT DOCUMENTS

| | | | |
|---|---|---|---|
| 5,291,960 A | 3/1994 | Brandenburg et al. | 180/65.2 |
| 5,327,987 A | 7/1994 | Abdelmalek | 180/65.2 |
| 5,358,317 A | 10/1994 | Cikanek | 303/100 |
| 5,359,308 A | 10/1994 | Sun et al. | 335/216 |
| 5,376,869 A | 12/1994 | Konrad | 318/587 |
| 5,403,244 A | 4/1995 | Tankersley et al. | 477/20 |
| 5,406,126 A | 4/1995 | Hadley et al. | 290/45 |
| 5,412,251 A | 5/1995 | Furutani et al. | 290/16 |
| 5,450,324 A | 9/1995 | Cikanek | 364/426.02 |
| 5,495,912 A | 3/1996 | Gray, Jr. et al. | 180/165 |
| 5,511,859 A | 4/1996 | Kade et al. | 303/3 |
| 5,549,087 A | 8/1996 | Gray, Jr. et al. | 123/254 |
| 5,562,079 A | 10/1996 | Gray, Jr. | 123/276 |
| 5,568,023 A | 10/1996 | Grayer et al. | 318/139 |
| 5,579,640 A | 12/1996 | Gray, Jr. et al. | 60/413 |
| 5,589,743 A | 12/1996 | King | 318/139 |
| 5,608,308 A | 3/1997 | Kiuchi et al. | 322/11 |
| 5,609,131 A | 3/1997 | Gray, Jr. et al. | 123/299 |
| 5,611,300 A | 3/1997 | Gray, Jr. | 123/48 A |
| 5,614,809 A | 3/1997 | Kiuchi et al. | 322/11 |
| 5,617,823 A | 4/1997 | Gray, Jr. et al. | 123/254 |
| 5,621,304 A | 4/1997 | Kiuchi et al. | 322/18 |
| 5,659,240 A | 8/1997 | King | 320/30 |
| 5,698,955 A | 12/1997 | Nii | 318/139 |
| 5,707,115 A | 1/1998 | Bodie et al. | 303/3 |
| 5,725,064 A | 3/1998 | Ibaraki et al. | 180/65.2 |
| 5,778,326 A | 7/1998 | Moroto et al. | 701/22 |
| 5,789,882 A | 8/1998 | Ibaraki et al. | 318/148 |
| 5,791,427 A | 8/1998 | Yamaguchi | 180/65.3 |
| 5,806,617 A | 9/1998 | Yamaguchi | 180/65.2 |
| 5,818,116 A | 10/1998 | Nakae et al. | 290/38 R |
| 5,842,534 A | 12/1998 | Frank | 180/65.2 |
| 5,867,009 A | 2/1999 | Kiuchi et al. | 322/16 |
| 5,881,559 A | 3/1999 | Kawamura | 60/59.7 |
| 5,887,674 A | 3/1999 | Gray, Jr. | 180/307 |
| 5,898,282 A | 4/1999 | Drozdz et al. | 318/139 |
| 5,899,828 A | 5/1999 | Yamazaki et al. | 477/4 |
| 5,905,360 A | 5/1999 | Ukita | 320/118 |
| 5,915,489 A | 6/1999 | Yamaguchi | 180/65.2 |
| 5,915,801 A | 6/1999 | Taga et al. | 303/152 |
| 5,927,415 A | 7/1999 | Ibaraki et al. | 180/65.2 |
| 5,939,794 A | 8/1999 | Sakai et al. | 290/40 A |
| 5,951,614 A | 9/1999 | Tabata et al. | 701/54 |
| 5,965,991 A | 10/1999 | Koike et al. | 318/139 |
| 5,969,624 A | 10/1999 | Sakai et al. | 340/636 |
| 5,984,033 A | 11/1999 | Tamagawa et al. | 180/65.2 |
| 5,992,153 A | 11/1999 | Tsuchihashi et al. | 60/716 |
| 6,026,921 A | 2/2000 | Aoyama et al. | 180/65.2 |
| 6,054,844 A | 4/2000 | Frank | 322/16 |
| 6,057,605 A | 5/2000 | Bourne et al. | 290/40 C |
| 6,067,801 A | 5/2000 | Harada et al. | 60/705 |
| 6,083,138 A | 7/2000 | Aoyama et al. | 477/5 |
| 6,098,733 A * | 8/2000 | Ibaraki et al. | 180/65.2 |
| 6,109,237 A * | 8/2000 | Pels et al. | 123/339.19 |
| 6,116,363 A | 9/2000 | Frank | 180/65.2 |
| 6,123,163 A | 9/2000 | Otsu et al. | 180/65.8 |
| 6,131,538 A | 10/2000 | Kanai | 123/2 |
| 6,137,250 A | 10/2000 | Hirano et al. | 318/376 |
| 6,155,954 A | 12/2000 | Itoyama et al. | 477/5 |
| 6,170,524 B1 | 1/2001 | Gray, Jr. | 137/625.18 |
| 6,173,574 B1 | 1/2001 | Obayashi et al. | 60/710 |
| 6,176,808 B1 * | 1/2001 | Brown et al. | 477/5 |
| 6,186,126 B1 | 2/2001 | Gray, Jr. | 123/557 |
| 6,189,493 B1 | 2/2001 | Gray, Jr. | 123/52.4 |
| 6,190,282 B1 | 2/2001 | Deguchi et al. | 477/5 |
| 6,202,416 B1 | 3/2001 | Gray, Jr. | 60/620 |
| 6,203,468 B1 | 3/2001 | Nitta et al. | 477/5 |
| 6,215,198 B1 | 4/2001 | Inada et al. | 290/40 C |
| 6,216,462 B1 | 4/2001 | Gray, Jr. | 60/616 |
| 6,232,733 B1 | 5/2001 | Obayashi et al. | 318/432 |
| 6,253,866 B1 | 7/2001 | Kojima | 180/65.2 |
| 6,269,290 B1 | 7/2001 | Egami et al. | 701/22 |
| 6,278,915 B1 | 8/2001 | Deguchi et al. | 701/22 |
| 6,290,012 B1 | 9/2001 | Matsubara et al. | 180/65.4 |
| 6,301,888 B1 | 10/2001 | Gray, Jr. | 60/605.2 |
| 6,301,891 B2 | 10/2001 | Gray, Jr. | 60/616 |
| 6,307,277 B1 | 10/2001 | Tamai et al. | 290/40 C |
| 6,317,665 B1 | 11/2001 | Tabata et al. | 701/22 |
| 6,318,486 B2 | 11/2001 | Masaki | 180/65.2 |
| 6,318,487 B2 | 11/2001 | Yanase et al. | 180/65.2 |
| 6,321,143 B1 | 11/2001 | Phillips et al. | 701/22 |
| 6,321,144 B1 | 11/2001 | Crombez | 701/22 |
| 6,326,702 B1 | 12/2001 | Yonekura et al. | 290/40 C |
| 6,328,670 B1 | 12/2001 | Minowa et al. | 477/5 |
| 6,330,498 B2 | 12/2001 | Tamagawa et al. | 701/22 |
| 6,334,079 B1 | 12/2001 | Matsubara et al. | 701/22 |
| 6,335,574 B1 * | 1/2002 | Ochiai et al. | 290/40 C |
| 6,343,252 B1 | 1/2002 | Asami et al. | 701/113 |
| 6,345,216 B1 | 2/2002 | Morimoto et al. | 701/22 |
| 6,346,064 B1 | 2/2002 | Hada et al. | 477/171 |
| 6,351,698 B1 * | 2/2002 | Kubota et al. | 701/51 |
| 6,352,489 B1 | 3/2002 | Kuroda et al. | 477/5 |
| 6,358,180 B1 | 3/2002 | Kuroda et al. | 477/4 |
| 6,366,059 B1 | 4/2002 | Wakashiro et al. | 322/16 |
| 6,367,570 B1 | 4/2002 | Long, III et al. | 180/65.2 |
| 6,369,539 B1 | 4/2002 | Morimoto et al. | 318/369 |
| 6,371,889 B1 | 4/2002 | Kuroda et al. | 477/181 |
| 6,373,206 B1 | 4/2002 | Morimoto et al. | 318/139 |
| 6,376,927 B1 | 4/2002 | Tamai et al. | 290/40 C |
| 6,377,007 B1 | 4/2002 | Ozaki et al. | 318/432 |
| 6,381,522 B1 | 4/2002 | Watanabe et al. | 701/22 |
| 6,386,170 B1 * | 5/2002 | Iwano et al. | 123/196 R |
| 6,394,209 B1 | 5/2002 | Goehring et al. | 180/65.4 |
| 6,405,121 B2 | 6/2002 | Tamura et al. | 701/96 |
| 6,415,607 B1 | 7/2002 | Gray, Jr. | 60/616 |
| 6,415,897 B1 | 7/2002 | Sugimoto et al. | 188/353 |
| 6,429,613 B2 | 8/2002 | Yanase et al. | 318/139 |
| 6,435,294 B1 | 8/2002 | Hara et al. | 180/65.4 |
| 6,460,500 B1 | 10/2002 | Ooyama et al. | 123/179.3 |
| 6,469,402 B2 | 10/2002 | Morimoto et al. | 290/40 C |
| 6,473,683 B1 | 10/2002 | Nada | 701/82 |
| 6,476,573 B2 | 11/2002 | Omata et al. | 318/445 |
| 6,484,833 B1 | 11/2002 | Chhaya et al. | 180/65.4 |
| 6,532,926 B1 | 3/2003 | Kuroda et al. | 123/179.4 |
| 6,549,840 B1 * | 4/2003 | Mikami et al. | 701/69 |
| 6,621,175 B1 | 9/2003 | Kuroda et al. | 290/40 D |
| 6,622,078 B1 | 9/2003 | Kuragaki et al. | 701/96 |
| 6,622,804 B2 * | 9/2003 | Schmitz et al. | 180/65.2 |
| 6,624,529 B2 * | 9/2003 | Obayashi | 290/40 C |
| 6,625,534 B2 | 9/2003 | Suzuki et al. | 701/62 |
| 6,629,027 B2 * | 9/2003 | Yamaguchi et al. | 701/22 |
| 6,634,447 B1 | 10/2003 | Matsubara et al. | 180/65.2 |
| 6,664,651 B1 * | 12/2003 | Breida et al. | 290/29 |
| 6,724,165 B2 | 4/2004 | Hughes | 318/376 |
| 6,724,300 B2 | 4/2004 | Miyakoshi et al. | 340/435 |
| 6,742,487 B2 | 6/2004 | Yamaguchi et al. | 123/179.3 |
| 6,765,306 B2 * | 7/2004 | Fattic | 290/40 C |
| 6,809,429 B1 | 10/2004 | Frank | 290/40 C |
| 6,895,917 B2 | 5/2005 | Itoh et al. | 123/179.4 |
| 6,898,506 B2 | 5/2005 | Kawai et al. | 701/84 |
| 6,900,552 B2 | 5/2005 | Fukano et al. | 290/40 C |
| 6,915,782 B2 | 7/2005 | Hanada et al. | 123/399 |
| 6,930,405 B2 | 8/2005 | Gunji | 290/40 C |
| 6,932,738 B2 | 8/2005 | Aoki et al. | 477/5 |
| 6,934,610 B2 | 8/2005 | Wakashiro et al. | 701/22 |
| 6,941,198 B2 | 9/2005 | Brigham et al. | 701/22 |
| 6,943,460 B2 | 9/2005 | Wakashiro et al. | 290/40 C |
| 2002/0052677 A1 | 5/2002 | Lasson et al. | 701/22 |
| 2002/0055411 A1 | 5/2002 | Yoshiaki et al. | 477/107 |
| 2002/0065165 A1 | 5/2002 | Lasson et al. | 477/3 |

| | | | | | |
|---|---|---|---|---|---|
| 2004/0178635 A1 | 9/2004 | Gray, Jr. ............... 290/40 C | JP | 7-317581 | 12/1995 |
| | | | JP | 8-47109 | 2/1996 |
| FOREIGN PATENT DOCUMENTS | | | JP | 9-70105 | 3/1997 |
| | | | JP | 9-98515 | 4/1997 |
| EP | 1 127 733 B1 | 8/2001 | WO | WO 01/51870 A1 | 7/2001 |
| EP | 1 211 117 A1 | 6/2002 | WO | WO 01/65100 A2 | 9/2001 |
| GB | 200 14 160 U1 | 12/2001 | | | |
| JP | 5-199609 | 8/1993 | * cited by examiner | | |

METHODS OF OPERATING A SERIES HYBRID VEHICLE

CROSS-REFERENCE TO RELATED APPLICATION

This application is a divisional of U.S. patent application Ser. No. 10/672,732, filed Sep. 25, 2003, now pending, which application is incorporated herein by reference in its entirety.

BACKGROUND OF THE INVENTION

1. Field of the Invention

The present invention relates generally to methods for operating a series hybrid vehicle and, more specifically, to methods for maximizing fuel efficiency while minimizing disruptions in drivability.

2. Description of the Related Art

The term "hybrid vehicle," in the broadest sense, denotes a vehicle having more than one power source and one or more energy storage means. The goal of a hybrid vehicle is to combine several similar or dissimilar types of energy stores and/or energy converters with different drive components, and operate each power source under varying operating conditions in a manner that results in greater overall energy savings than would otherwise be achieved through the use of a single power source.

The primary power source of a hybrid vehicle is usually an engine powered by fuel energy (primary energy), and the secondary power source is usually, but not limited to, one or more electric motors/generators powered by electric energy (a form of "secondary energy") and/or one or more hydraulic motors/pumps powered by hydraulic pressure (also a form of "secondary energy").

When the drive components of a hybrid vehicle allow the vehicle's primary and secondary power sources to both independently transmit power to the vehicle's wheels, the vehicle is commonly referred to as a parallel hybrid vehicle and the wheels of the vehicle can be driven solely by an engine (as is done with conventional vehicles), or solely by the secondary power source. In contrast, when the drive components of a hybrid vehicle are configured such that only the vehicle's secondary power source transmits power to the vehicle's wheels, the vehicle is commonly referred to as a series hybrid vehicle. In series hybrid vehicles, the engine is used to convert energy and provide power with which to power the secondary power source, but the engine is not mechanically linked to the vehicle's wheels.

To date, parallel hybrid vehicles have been more commercially successful than series hybrid vehicles. For example, the Insight, a hybrid vehicle manufactured by Honda Motor Company, and the Prius, a hybrid vehicle manufactured by Toyota Motor Corporation, represent the first two mass-marketed hybrids, and both are parallel hybrid vehicles.

The commercial success of parallel hybrid vehicles over series hybrids is, in large part, due to the state of technology and knowledge that have been available with respect to energy storage devices used for storing a hybrid vehicle's secondary energy. For example, many of the first generation secondary energy storage devices, such as early generation batteries, require a low charge rate in order to preserve the life of the energy storage device. This low charge rate requirement restricts the design choices available to a hybrid vehicle designer and, in particular, restricts the choices available for a series hybrid more than it restricts the choices available for a parallel hybrid. In series hybrid vehicles, the charge rate is, by definition, provided by an engine. Thus, design choices affecting the size and calibration of an engine in a series hybrid vehicle employing previous generation energy storage devices are limited by the need to have the engine of a series hybrid produce a low enough power level to generate the required low charge rate, while still achieving greater overall energy savings from the hybrid design than would otherwise be achieved through the use of a single power source.

Since engine efficiency is better at high loads than at low loads, engines in prior art series hybrid vehicles are typically very small, and are calibrated to operate at high loads. This allows the engine to operate closer to its maximum efficiency level while still producing a low enough power level to generate the required low charge rate. However, due to the low charge rate, the energy stored within previous generation energy storage devices is often used up more quickly than it can be replenished. Thus, when the energy stored within the energy storage device of a series hybrid vehicle is depleted, the driver is unable to complete a trip because the engine alone is too small to safely propel the vehicle.

As a result, there is a need for a new and improved method of operating a series hybrid vehicle.

BRIEF SUMMARY OF THE INVENTION

The invention is directed toward new and improved methods for operating a series hybrid vehicle in a manner designed to further the vehicle's overall energy efficiency gains.

According to principles of the present invention, when the driver of a series hybrid vehicle makes a demand for power output, a secondary power source(s) is supplied with, and thereby powered by, either (1) secondary energy stored in an energy storage device(s), (2) secondary energy generated by an engine(s) and used to directly supply power to the secondary power source ("direct input energy," or (3) both. The determination as to which selection is made depends on the amount of available secondary energy stored in the vehicle's secondary energy storage device(s), and in some cases depends also on the power level being demanded by the driver. If the engine is not generating secondary energy, the engine is either turned off or at idle. However, if the engine is generating secondary energy, the power/efficiency level at which the engine operates depends on either (1) the amount of available secondary energy stored in the vehicle's secondary storage device, or (2) the amount of available secondary energy stored in the vehicle's secondary storage device and the vehicle speed.

In one embodiment, a series hybrid vehicle is operated by selectively generating an amount of primary power from a primary power source, converting a first portion of the amount of primary power from the primary power source into an amount of direct input energy, and powering the secondary power source directly with the amount of direct input energy.

In another embodiment, a secondary power source in a series hybrid vehicle is operated by monitoring an amount of available stored energy within an energy storage device and operating an engine (1) at or near a first power level when the amount of available stored energy is within a predetermined upper range of available stored energy, (2) at or near a second power level when the amount of available stored energy is within a predetermined lower range of available stored energy, and (3) within a range of power levels when the amount of available stored energy is within a predetermined middle range of available stored energy.

In yet another embodiment, a series hybrid vehicle is operated by monitoring an amount of available stored energy within an energy storage device and, based on the amount of available stored energy, selectively powering the secondary power source with either (1) a portion of the amount of available stored energy, (2) a portion of an amount of direct input energy, or (3) a combination of a portion of the amount of available stored energy and a portion of the amount of direct input energy.

DETAILED DESCRIPTION OF THE INVENTION

Figure 1:
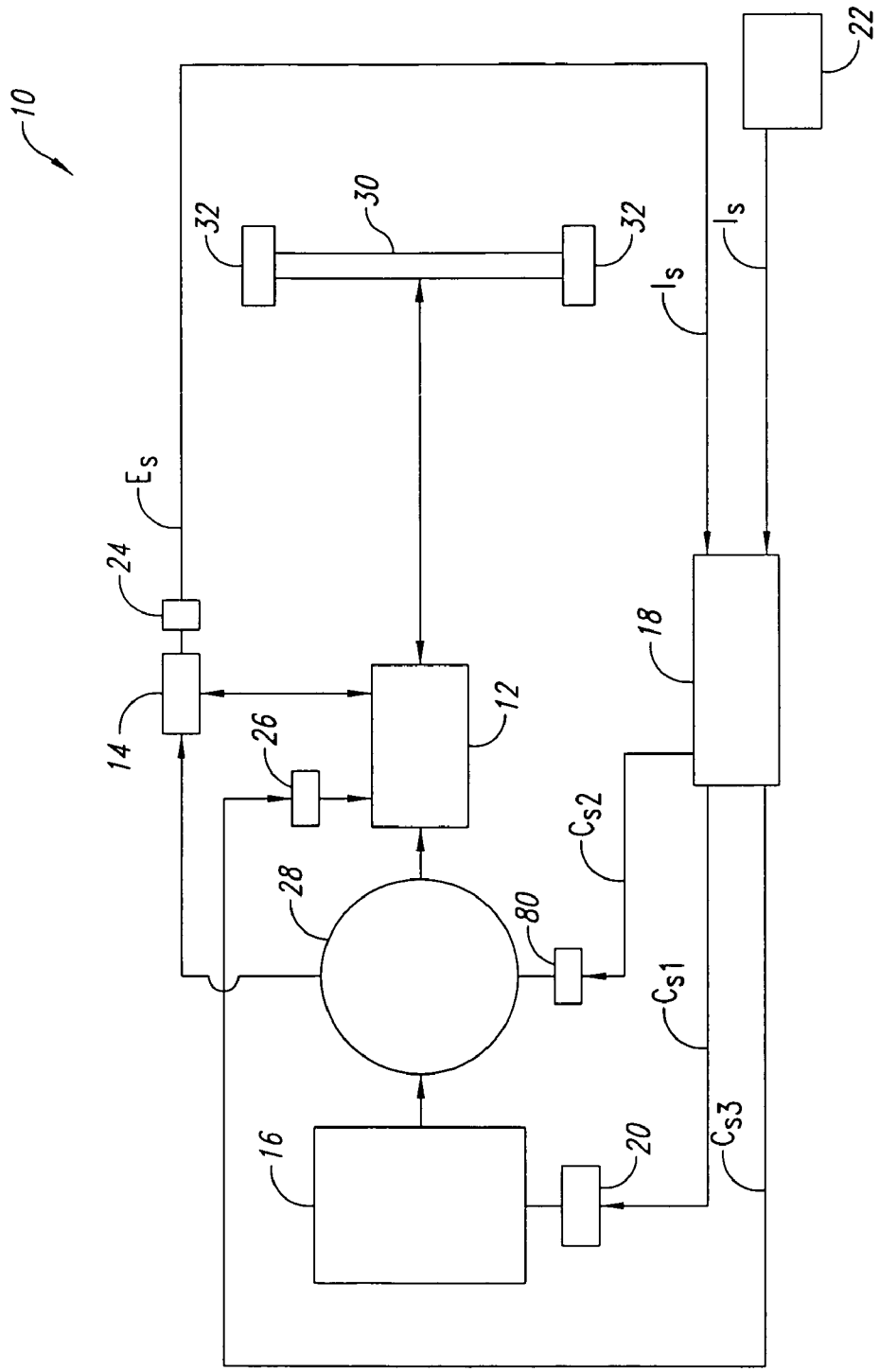
FIG. 1 is a schematic diagram of a series hybrid vehicle provided in accordance with the present invention.

In the following description, certain specific details are set forth in order to provide a thorough understanding of various embodiments of the invention. However, one of ordinary skill in the art will understand that the invention may be practiced without these details. In other instances, well-known structures associated with hybrid vehicles have not been shown or described in detail to avoid unnecessarily obscuring descriptions of the embodiments of the invention.

The term "primary power source," as used herein, denotes an engine such as an internal combustion engine (e.g., a compression ignition engine, a spark ignition engine, or gas turbine engine) or an external combustion engine (e.g., a Stirling engine), a fuel cell, or other primary energy converter.

The term "variable displacement engine," as used herein, refers to a multi-cylinder engine wherein each of the cylinders is selectively operated (individually or as a group) such that the engine's total displacement is thereby selectively increased or decreased.

The term "secondary power source," as used herein, denotes a power source having a two-way energy path and thus capable of capturing a vehicle's kinetic energy during the vehicle's braking process. A secondary power source may include, for example, one or more electric or hydraulic pump/motors. As is to be understood by one of ordinary skill in the art, other like systems may also be employed, and the secondary pump/motors described herein do not limit the scope of the invention.

Depending on the type of secondary power system selected for use, the energy used to power the secondary power source ("secondary energy") may consist of electric energy, hydraulic energy, or any other form of energy that can be, at least in part, obtained from the vehicle's kinetic energy during the braking process, and reused to power a secondary power source.

The term "energy storage device," as used herein, denotes a system capable of receiving and storing the secondary energy, and allowing for its reuse to power a secondary power source. Such a system may, for example, consist of ultracapacitors, electric batteries, mechanical flywheels or hydraulic accumulators. As is to be understood by one of ordinary skill in the art, other like systems may also be employed, and the systems described herein do not limit the scope of the invention.

The term "available stored energy," as used herein, refers to all of the energy stored in an energy storage device, less any minimal amount which may be necessary to maintain the functionality of the storage device and/or less any amount used to supply energy to a device other than a secondary power source used to propel the vehicle.

The term "direct input energy," as used herein, refers to secondary energy generated by a primary power source and used to directly supply energy to a secondary power source, as opposed to storing the energy for use at a later time.

The term "storable energy," as used herein, refers to energy generated by a primary power source or a regenerative braking system and capable of being stored within an energy storage device to power a secondary power source at a later time.

Further, the terms "primary power source," "secondary power source," "engine," "energy storage device," "control processing unit," and other components of the present invention are, for ease of discussion, often referred to herein in the singular. However, as will be understood by one of ordinary skill in the art, the present invention may employ more than one of the components used to perform the functions of the present invention, and thus components referred to in the singular are not to be construed as limiting the number of components employed.

The headings provided herein are for convenience only and do not define or limit the scope or meaning of the claimed invention.

Applicability and General Overview

According to principles of the present invention, when the driver of a series hybrid vehicle 10 (FIG. 1) makes a demand for power output, a secondary power source(s) 12 is used to propel the vehicle. The secondary power source 12 is supplied with, and thereby powered by, either (1) an amount of available stored energy in an energy storage device(s) 14, (2) direct input energy generated by an engine(s) 16, or (3) both. The determination as to which selection is made depends on the amount of available stored energy stored within the vehicle's 10 energy storage device 14. When the engine 16 is used, the efficiency level at which the engine 16 operates depends on either (1) the amount of available secondary energy stored in the vehicle's 10 energy storage device 14 or (2) the vehicle's 10 speed and the amount of available secondary energy stored in the vehicle's 10 energy storage device 14.

As shown in FIG. 1, the secondary power source 12, for example a pump/motor, is coupled to the primary power source (engine) 16 via a generator 28, for example a pump/motor. When the engine 16 is operating, the generator 28 is used to convert the engine's 16 power into energy compatible for input into the secondary power source (e.g., electric current or pressurized hydraulic fluid). The converted energy is either supplied directly to the secondary power source 12 as direct input energy to power the secondary power source 12 as a motor, and/or supplied to the vehicle's energy storage device 14 and stored for later use (storable energy). As is to be understood by one of ordinary skill in the art, the type of generator 28 used necessarily depends on the type of energy required to operate the secondary power source 12. For example, if the secondary power source 12 is an electric generator/motor, then the generator 28 is an electric generator. Similarly, if the secondary power source 12 is a hydraulic pump/motor, then the generator 28 is a hydraulic pump. Generator 28 may also be used to start the engine 16 by acting as a motor using energy from energy storage device 14.

Fuel energy stored in a vehicle tank (not shown) is used to power the engine 16. An engine control device 20, coupled to the engine 16, and in communication with a CPU 18, controls fuel delivery to the engine 16. A generator control device 80, coupled to the generator 28, and in communication with CPU 18, controls the speed of engine 16 by varying load. Based on the amount of available stored energy and, optionally, the vehicle speed, the CPU 18 issues a command signal $C_{s1}$ to the engine control device 20 and a command signal $C_{s2}$ to the generator control device 80 to operate the engine 16 at a number of preselected power levels.

As is known to those of ordinary skill in the art, an engine 16 can be operated at a preselected power level by operating the engine at a preselected engine speed for a given engine torque value. As is further known to those of ordinary skill in the art, a desired engine torque can be achieved by increasing or decreasing the amount of fuel supplied to an engine 16. Thus, included among the many sensors (not all shown) which provide an input signal $I_s$ to the CPU 18 of the present invention, there are sensors which detect and monitor engine speed and engine torque. Other sensors detect the driver's command to brake the vehicle 10, the driver's command to power the vehicle 10, and monitor vehicle speed. For example, the driver's demand to power the vehicle is represented by throttle sensor 22.

Further, a secondary energy capacity sensor 24 monitors the amount of available stored energy at any given time and generates a signal $E_s$ representative of the energy detected. The CPU 18 also includes a memory for storing various lookup tables. Methods of monitoring an amount of available stored energy and issuing commands in response to detecting a predetermined amount of available energy in a hybrid vehicle are described in commonly assigned U.S. patent application Ser. No. 10/386,029, filed Mar. 10, 2003, entitled "METHODS OF OPERATING A PARALLEL HYBRID VEHICLE," which is incorporated herein by reference.

A secondary power source control device 26 is coupled to the secondary power source 12 and used to control operation of the secondary power source 12. Thus, when a driver issues a command to power the vehicle 10, the CPU 18 detects this command and issues a command signal $C_{s3}$ directing the secondary power source control device 26 to operate the secondary power source 12 as a motor. When in motor mode, the secondary power source 12 transmits power through a mechanical linkage 30 to the vehicle's 10 wheels 32, and thereby propels the vehicle 10.

As mentioned above and explained in further detail below, when the engine 16 is operating, an amount of energy from the engine 16 is converted into an amount of storable energy and stored within the vehicle's energy storage device 14 when certain vehicle 10 operating parameters are met. However, as is known to those of ordinary skill in the art, storable energy can also be obtained by capturing the vehicle's kinetic energy during a braking event.

When a driver issues a command to brake the vehicle 10 and the amount of available energy stored within the energy storage device 14 is either below full capacity or below a preselected level, the CPU 18 directs the secondary power source control device 26 to operate the secondary power source 12 as a generator/pump. The vehicle's kinetic energy is then directed to the generator/pump 12, converted into an amount of storable energy, and stored within the vehicle's 10 energy storage device 14.

Determining How to Power the Secondary Power Source

Figure 2:
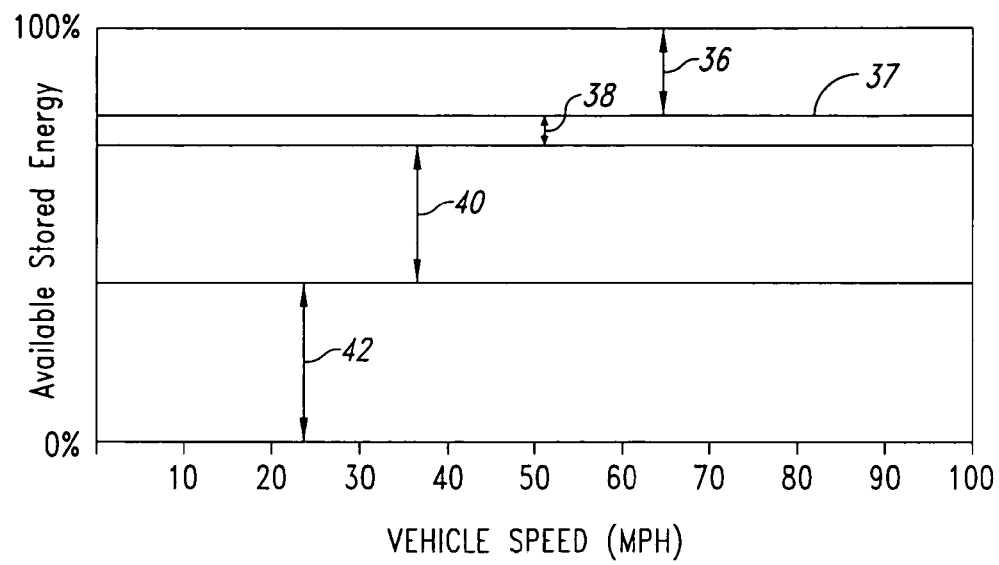
FIG. 2 is a graphic representation for controlling the operation of a series hybrid vehicle according to one embodiment of the present invention.
Figure 3:
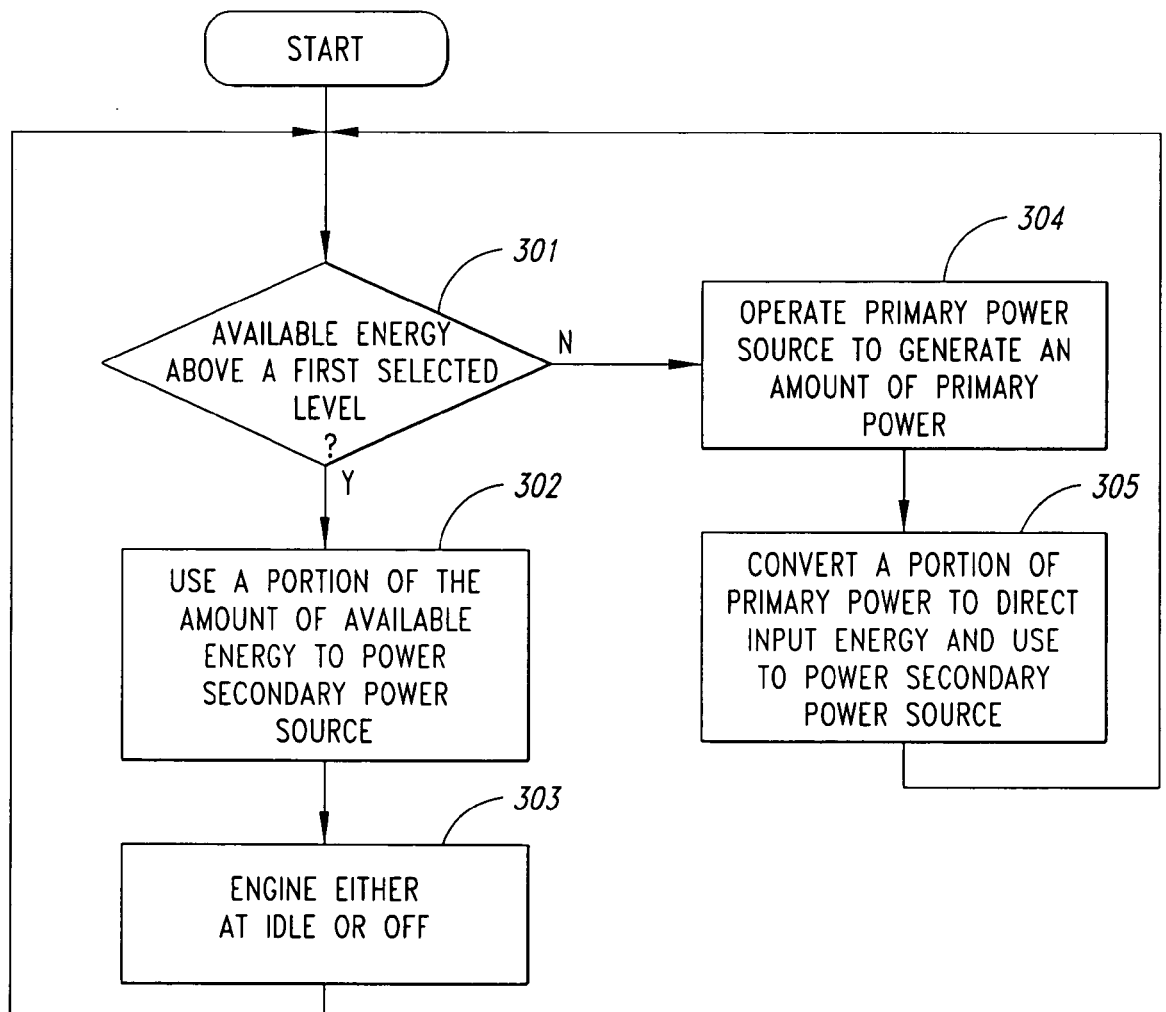
FIG. 3 is a logic flow diagram for controlling the operation of a series hybrid vehicle used in accordance with the embodiment provided in FIG. 2.

FIGS. 2 and 3 show one embodiment for supplying power to the secondary power source 12 in response to a demand to power the vehicle. In this embodiment, an amount of available stored energy within the vehicle's 10 energy storage device 14 is monitored and if the available stored energy is at or above a first selected level of available stored energy (depicted as line 37 in FIG. 2, and at step 301 in FIG. 3), the primary power source 16 does not supply energy to the secondary power source 12. Instead, a portion of the amount of the available stored energy is used to power the secondary power source 12 (step 302). During this time, the engine is either on and idling, or, alternatively, off (step 303). Determining whether to idle the engine 16 or to turn it off is a design choice, and both options provide certain advantages.

If it is desired to maximize the vehicle's 10 drivability, the engine 16 remains on and is at idle. This minimizes the driver's perception that the engine 16 is no longer generating energy and allows the engine 16 to quickly re-engage when needed; If it is desired to maximize the vehicle's 10 fuel efficiency, the engine 16 is turned off as soon as the available stored energy exceeds the first selected level (e.g., enters into range 36). However, if the engine 16 is turned off too quickly, there is a risk that customers will perceive that the vehicle is losing power. Thus, to maximize the vehicle's fuel efficiency and further minimize drivability disruptions, rather than turning the engine off when the available stored energy exceeds the first selected level, the engine is turned off when the available stored energy exceeds the first selected level and a command to decelerate the vehicle 10 is issued. This provides a more moderate approach that still results in fuel savings during the time the engine 16 is off, but synchronizes the timing of engine shut down with a driver issued command. In this way, the driver is able to logically relate to the sensation that the engine 16 is no longer generating power with a command that is intended to slow or coast the vehicle.

However, if the available stored energy is below the first selected level (depicted as line 37 in FIG. 2, and at step 301 in FIG. 3), then the engine 16 is operated to generate an amount of primary power (step 304), and the secondary power source is powered with a portion of direct input energy converted from the primary power source (step 305).

When primary power is generated and the amount of direct input energy is sufficient enough to meet a power demand, then direct input energy alone is used to power the secondary power source, and there is no need to use any of the available stored energy to power the secondary power source. When primary power is generated and the amount of direct input energy is not sufficient enough to meet a power demand, available stored energy may also be used, together with the amount of direct input energy, to augment the shortage.

However, in the event that the amount of available stored energy within the secondary energy storage device 14 is ever drawn to a level below a preselected "safety" level selected to indicate that the available stored energy is at or near depletion, it is preferred to discontinue use of any available stored energy. This is to preserve the life of the secondary energy storage device 14 and minimize performance problems that may result if the secondary energy storage device 14 is operated at too low of an energy level.

How the Primary Power Source Operates when Generating an Amount of Primary Power How the engine 16 is operated when generating an amount of primary power also depends on the amount of available energy within the energy storage device 14. The engine's 16 operation is discussed with continued reference to the exemplary embodiment shown in FIG. 2, reference to the exemplary power efficiency map shown in FIG. 4, and reference to the logic flow diagram shown in FIG. 5. As will be understood by one of ordinary skill in the art, the curved lines shown in FIG. 4 represent the percent efficiency at which a particular engine can be operated.

In accordance with one embodiment of the present invention, the engine is operated at different power levels depending on whether the available stored energy is within a predetermined upper range (see FIG. 2, range 38), a predetermined middle range (see FIG. 2, range 40), or a predetermined lower range (see FIG. 2, range 42).

Figure 4:
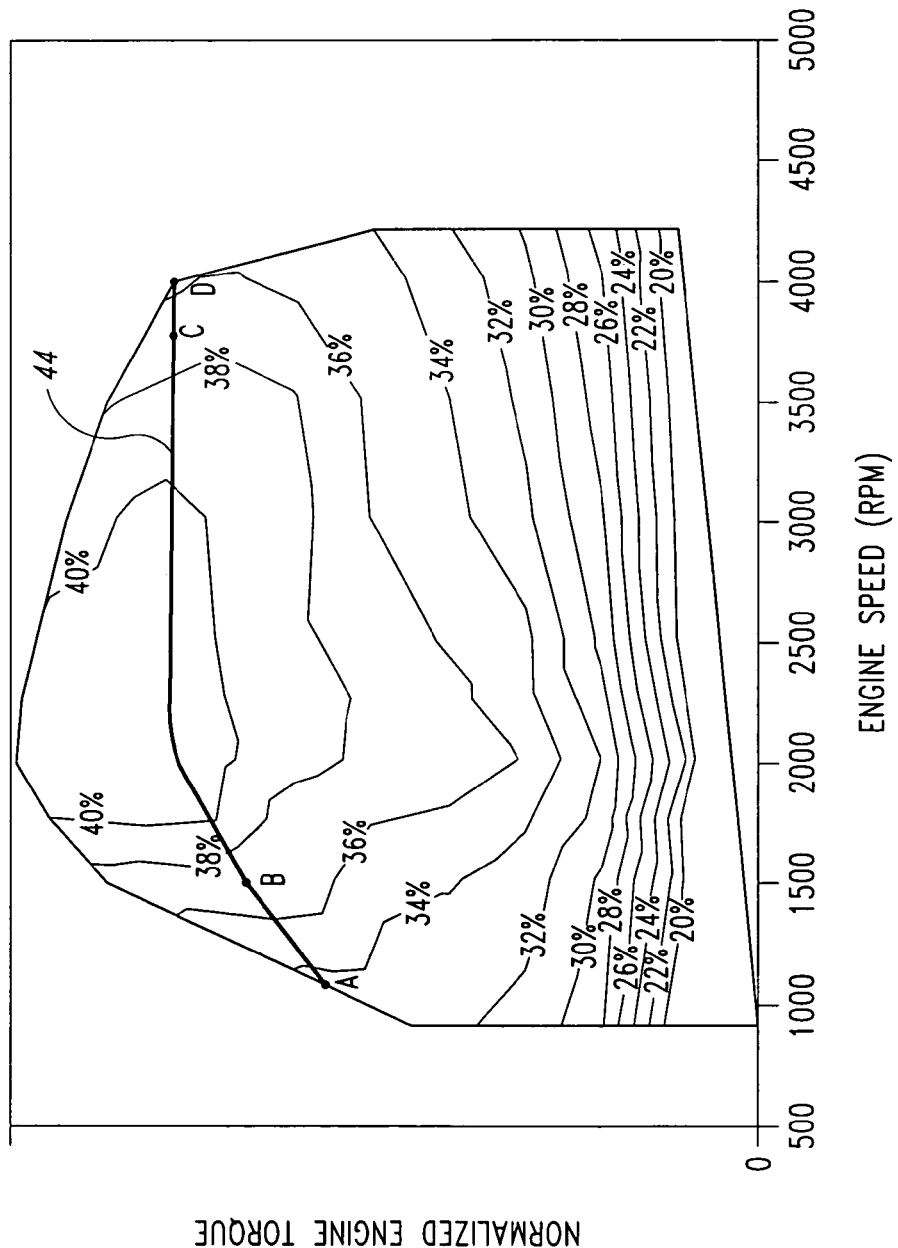
FIG. 4 is an exemplary power efficiency map for an engine in a series hybrid vehicle, showing exemplary target power points at which the engine is operated when used in accordance with the embodiment provided in FIG. 2.
Figure 5:
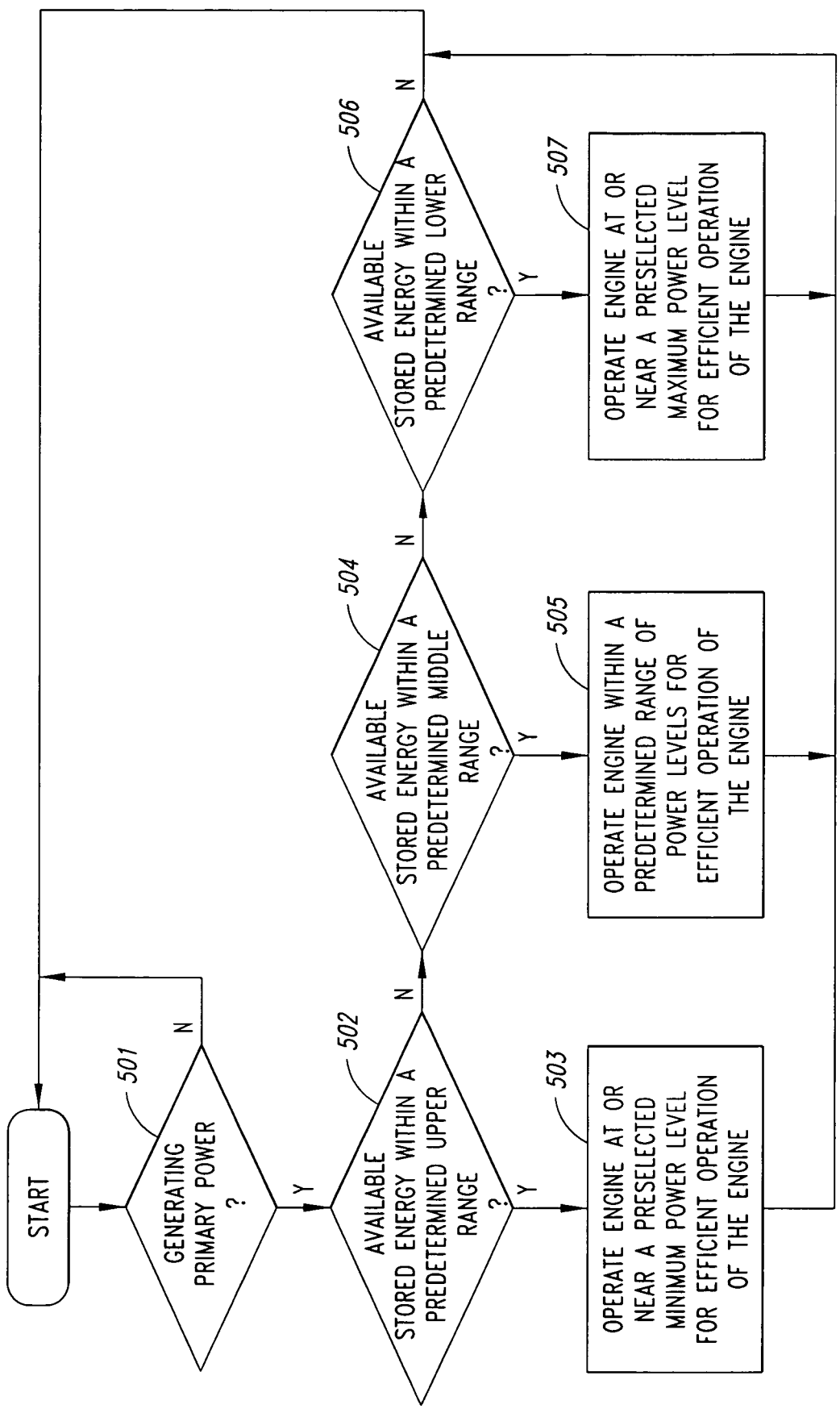
FIG. 5 is a logic flow diagram for controlling the operation of an engine in the series hybrid vehicle used in accordance with the embodiment provided in FIG. 2.

When the engine 16 generates primary power (FIG. 5, step 501) and the amount of available stored energy is within the predetermined upper range of available energy (e.g., below line 37 and within range 38 in FIG. 2, and at step 502 in FIG. 5), the engine is operated at or near a predefined minimum power level for efficient operation of the engine (FIG. 4, point A; FIG. 5, step 503). A first portion of the amount of primary power is converted into an amount of direct input energy and directly supplied to the secondary power source 12. Directly using the first portion of the amount of primary power, as opposed to first storing the first portion of the amount of primary power and then using it, as is done in many conventional series hybrid vehicles, serves to minimize energy transfer losses. As a result, greater energy efficiencies result.

In operating conditions where the direct input energy is not sufficient enough to power the secondary power source 12 and meet the driver's power demand, secondary energy stored within the vehicle's 10 energy storage device 14 is used to augment the required secondary energy. However, if the direct input energy is sufficient enough to meet the driver's power demand, the engine continues to be operated at or near its predefined minimum power level for efficient operation (FIG. 4, point A) and any additional power generated by the primary power source 16 is converted into an amount of storable energy for use at a later time—provided that secondary energy storage device 14 has sufficient enough capacity with which to store the amount of storable energy.

By purposefully having the engine 16 operate at or near its minimum power level for efficient operation (FIG. 4, point A) during the time the available stored energy is within the predetermined upper range 38 (FIG. 5, step 502), the primary power generated by the engine 16 is not likely to be sufficient enough to power the secondary power source to meet the driver's power demand. Therefore, it is more likely that an amount of available stored secondary energy will also be used. Thus, although the engine is operated at or near the engine's 16 predefined minimum power level for efficient operation (FIG. 4, point A), several advantages result.

First, using the vehicle's available stored energy creates an opportunity to use "free" energy (i.e., stored braking energy). Use of this "free" energy contributes to the overall energy efficiency of the vehicle. It also creates more space within the energy storage device 14 with which to capture more of the vehicle's 10 kinetic energy during the vehicle's next braking event. Second, using the vehicle's 10 available stored energy minimizes the likelihood that the available stored energy will, within a short time period, repeatedly operate above and below the first selected level of available stored energy for a given vehicle speed. If this were to happen, it could cause the engine 16 to rapidly cycle on and off and result in drivability issues. Third, using the vehicle's 10 available stored energy increases the likelihood that the available stored energy will drop to a level within the predetermined middle range 40 shown in FIG. 2.

When the available stored energy is within the predetermined middle range (e.g., within range 40 in FIG. 2; and at step 504 in FIG. 5), the engine 16 is operated at a range that is near a predefined range of power levels for efficient operation of the engine (e.g., between power levels B and C on torque/curve line 44 in FIG. 4; and at step 505 in FIG. 5). In one embodiment, the engine is operated within the predefined range of power levels, at a rate that is inversely proportional to the available stored energy within the predetermined middle range. For example, when the available stored energy is at a top most value selected to define the middle range of stored available energy 40, the engine is operated at a power level that is at or near the low end of its range of best power efficiency B, and when the available stored energy is at a bottom most value selected to define the middle range of stored available energy 40, the engine is operated at a power level that is at or near the high end of its range of best power efficiency C. Further, when available stored energy is at a value of equal distance between the top most and the bottom most value of the predetermined second range, the engine is operated at a power level that is near the midpoint of its range of best power efficiency. Operation of the engine at a range of power levels near the range of power levels B and C represents the power level at which the engine is likely to obtain its best operating efficiency. Thus, it is desirable to keep the vehicle operating within this predefined power range as much as possible.

One strategy for increasing the likelihood that the engine 16 will be operated within the desired predefined power range discussed above is to strive to maintain the amount of available energy within the energy storage device at a level that is within the predetermined middle range 40. Thus, in cases where the amount of available energy stored within the energy storage device 14 drops within the predetermined lower range of available energy (e.g., within range 42 in FIG. 2, and at step 506 in FIG. 5), including at the lower limit, the engine 16 is operated at or near a predefined maximum power level for efficient operation of the engine (FIG. 4, point D; FIG. 5, step 507). This causes the engine 16 to produce more power, and increases the likelihood that the amount of power generated by the primary power source and converted into energy will exceed the amount of direct input energy required to power the secondary power source. When the amount of energy generated by the engine 16 exceeds the amount of energy needed to power the secondary power source 12, any excess energy is converted into storable energy and stored within the energy storage device. This serves to replenish the amount of available stored energy within the energy storage device and thereby increases the likelihood that the amount of available energy is once again within the desired predetermined middle range 40.

Under this strategy, even when the vehicle's power demand is not large, if the available stored energy level is within the lower range, the engine will nevertheless continue to be operated at or near its maximum efficient power level until the available stored energy level is restored to the middle range.

Because the engine must supply the vehicle's full power demand in the event the energy storage device has been depleted to the lower limit of the lower range, the engine is preferably sized to be able to meet such potentially necessary sustained vehicle power demands. For example, the engine preferably would be of sufficient size to enable the vehicle to ascend a long grade at acceptable speed when fully loaded. Although operation of the vehicle under a condition such as ascending a long grade occurs rarely, the ability to handle such conditions is nevertheless likely required for a vehicle to be commercially acceptable to the public. An engine that could provide at least 60% to 70% of the desired peak acceleration power level for the vehicle would likely be sufficient for this preferred capability. This preferred engine size in the present invention differs from prior art series hybrid systems, which instead utilized engines of smaller size.

As discussed previously, many first generation secondary energy storage devices, such as early generation batteries, required low charge rates in order to preserve the life of the energy storage device. As a result, in series hybrid vehicles (i.e. wherein the charge rate is provided by the engine), the engine would need to produce power levels sufficiently low to generate the required low charge rates for the energy storage device. However, use of an energy storage device that can charge at faster rates for sustained periods of time will allow efficient use of a larger engine in a series hybrid vehicle. It is therefore also preferable in the present invention to use an energy storage device that can charge efficiently at faster charge rates, which will therefore enable efficient use of a larger engine size, allowing the engine to run at a high rate of power while the secondary energy source rapidly stores energy, such as would be preferred for conditions where the available stored energy is within the lower range as set forth above. An example of an energy storage device with the current capability to sustain such higher charge rates as are preferred for the present invention is the high pressure hydraulic accumulator.

Figure 7A:
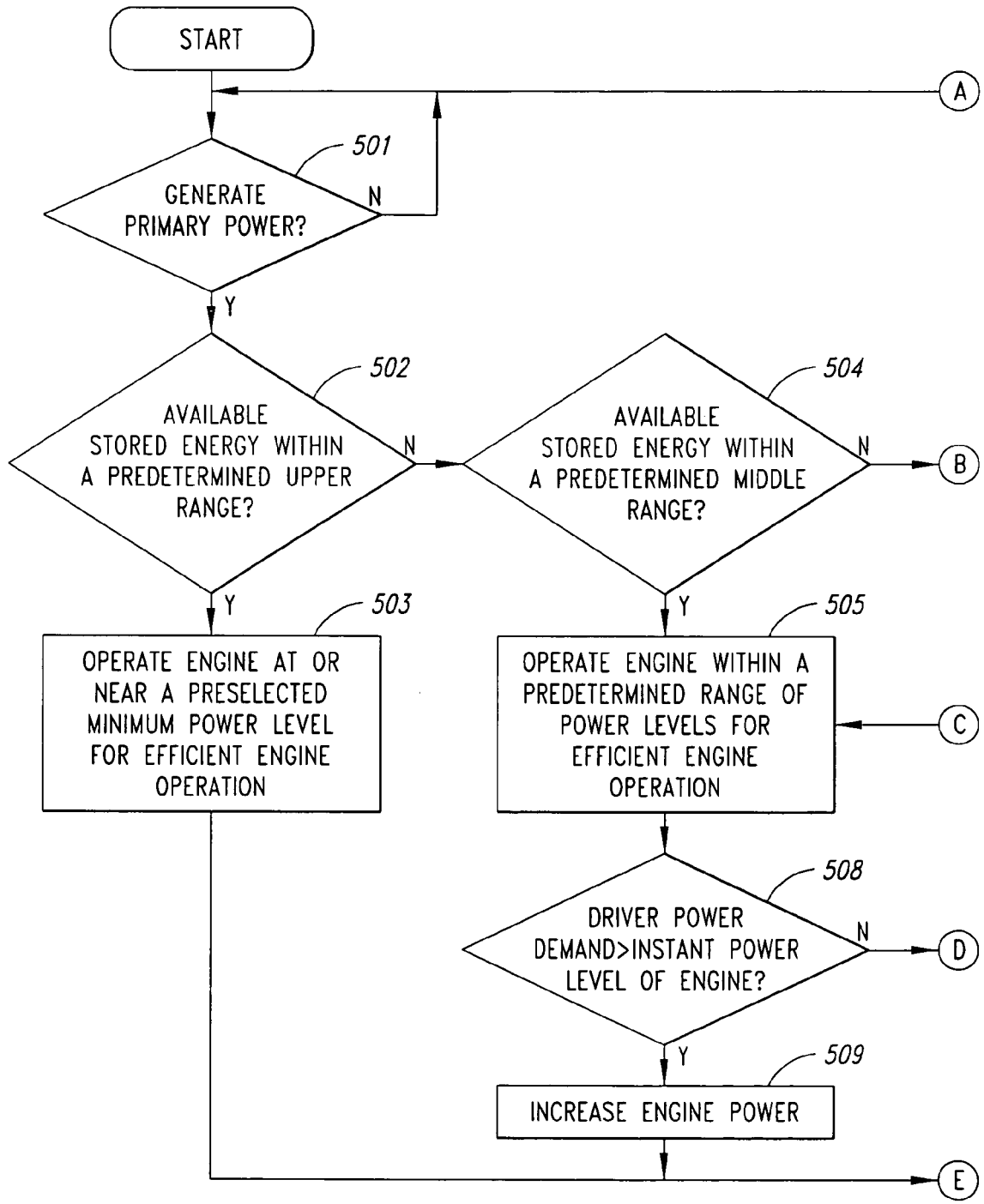
FIG. 7 (collectively shown as FIGS. 7A and 7B) is a logic flow diagram for controlling the operation of an engine in a series hybrid vehicle according to yet another embodiment of the present invention.
Figure 7B:
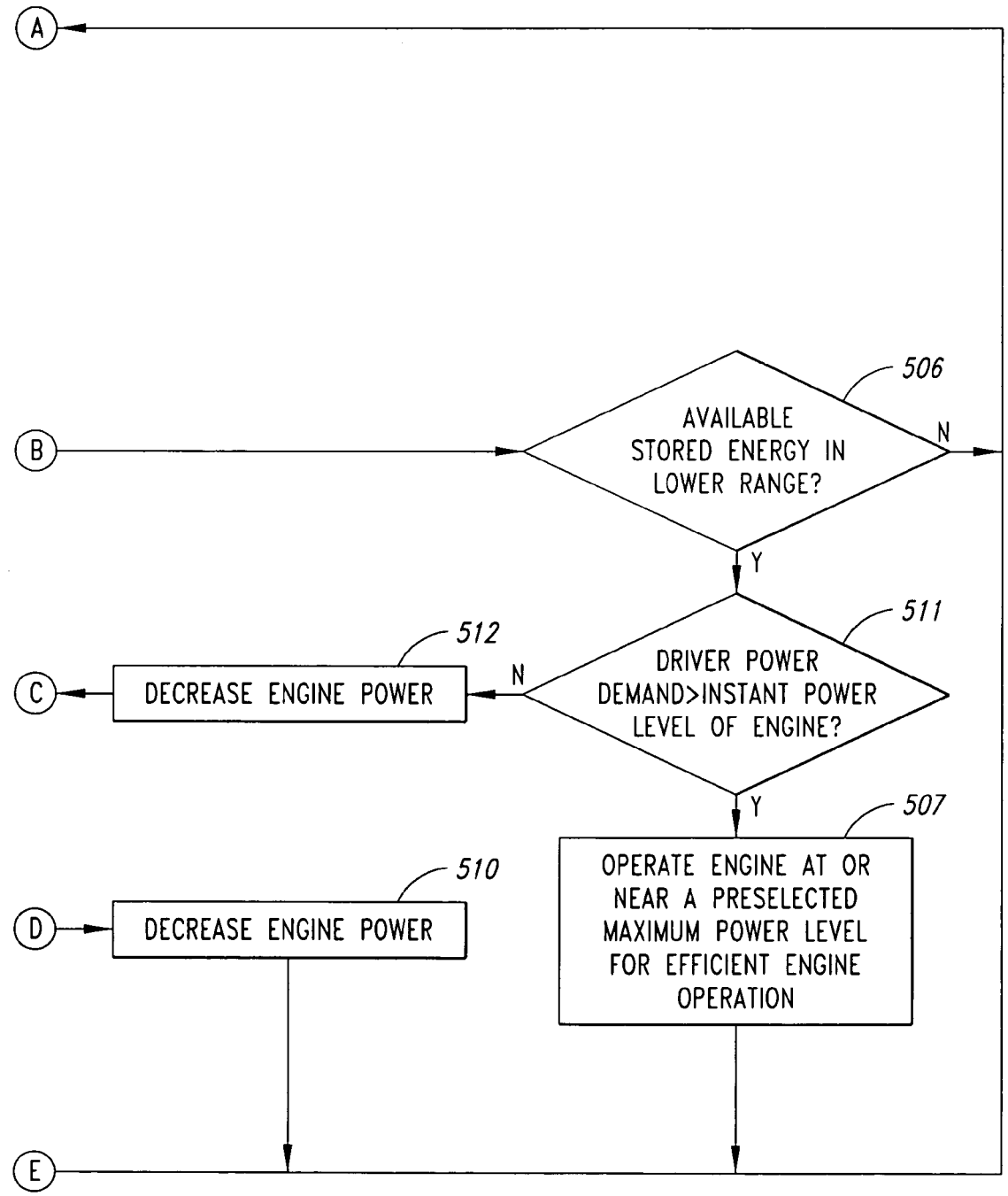

For additional drivability benefits, another preferred embodiment of the present invention also considers the power demanded by the vehicle driver in determining the power level to operate the engine, with additional reference to the logic flow diagram shown in FIG. 7. If the available stored energy is within a predetermined middle range (FIG. 2, range 40 and Step 504 in FIG. 7), the engine is still operated within a predetermined range of power levels for efficient operation (FIG. 4, points within B to C; Step 505 in FIG. 7), but the power level of the engine responds directionally (the rate of change is a calibration determination) to the power demanded by the vehicle driver (Step 508 of FIG. 7). If the driver power demand is greater than the instant power level of the engine, the engine power would be increased (Step 509); if lower, the engine power would be decreased (Step 510). If the available stored energy is within a predetermined lower range (FIG. 2, range 42, and Step 506 in FIG. 7), a determination is made whether the driver power demand is greater than the instant power level of the engine (Step 511). If the answer to Step 511 is yes, then the engine operates according to Step 507. If the answer to Step 511 is no, then the engine power level would be reduced (again the rate of change is a calibration determination) in Step 512, but the engine will still be constrained to operate within the power range of Step 505. An energy storage device that could efficiently sustain a charge rate matching 20% to 25% of the engine's maximum rated horsepower (or approximately point A in FIG. 4) would likely be sufficient for this preferred embodiment. This embodiment avoids the undesirable noise and feel to the driver of running the engine hard unnecessarily and out of synch with driver power demand. It also provides for more efficient engine use in the recharging of certain secondary energy storage devices.

As will be understood by those of ordinary skill in the art, the size of the secondary energy storage device will vary according to vehicle needs. Factors influencing the size of an energy storage device include, vehicle size, vehicle weight, vehicle speed, and the size of the primary and secondary power sources. Thus, although the present invention monitors available stored energy and performs certain functions according to the level of available stored energy within an energy storage device 14, the precise levels and ranges of available stored energy chosen as trigger points are a design choice determined by these factors. For example, larger energy storage devices 14 will allow the designer of a hybrid vehicle to use more of the vehicle's 10 available stored energy before reaching the threshold level of available stored energy which triggers the use of primary power, and when primary power is being used more of the operation (time) will occur within the desired predetermined middle range 40.

Optional Use of Additional Primary Power Sources

In an alternative embodiment, multiple engines are used. (As used here, "multiple engines" can also refer to a variable displacement engine with a first engine being the base displacement of the variable displacement engine and "additional engines" being the adding of increased displacement of the variable displacement engine.) For example, when the engine 16 is operated at or near the predefined maximum power level and the amount of primary power generated by the engine 16 and converted into energy does not exceed the amount of direct input energy required to power the secondary power source 12, additional engines (e.g., a total of two or more engines) may be used. Any additional engines may be operated at or near 1) a power level within a predefined range of power levels that is inversely proportional to the amount of available stored energy within the predetermined lower range (e.g., within range 42 in FIG. 2), or 2) a predefined maximum power level for efficient operation of the second engine.

Further use of additional engines (e.g., a total of two or more engines) may also be desirable when a first engine 16 is operated within the predetermined middle range of available stored energy (e.g., within range 40 in FIG. 2) and the power demanded by a user exceeds a predetermined level. This will lessen the likelihood that the amount of available stored energy will drop into the predetermined lower range of available stored energy 42, and increase the likelihood that the first engine 16 will continue to be operated within the predefined range for efficient operation of the engine 16.

Additional Embodiments for Triggering Use of the Primary Power Source(s)

Figure 6:
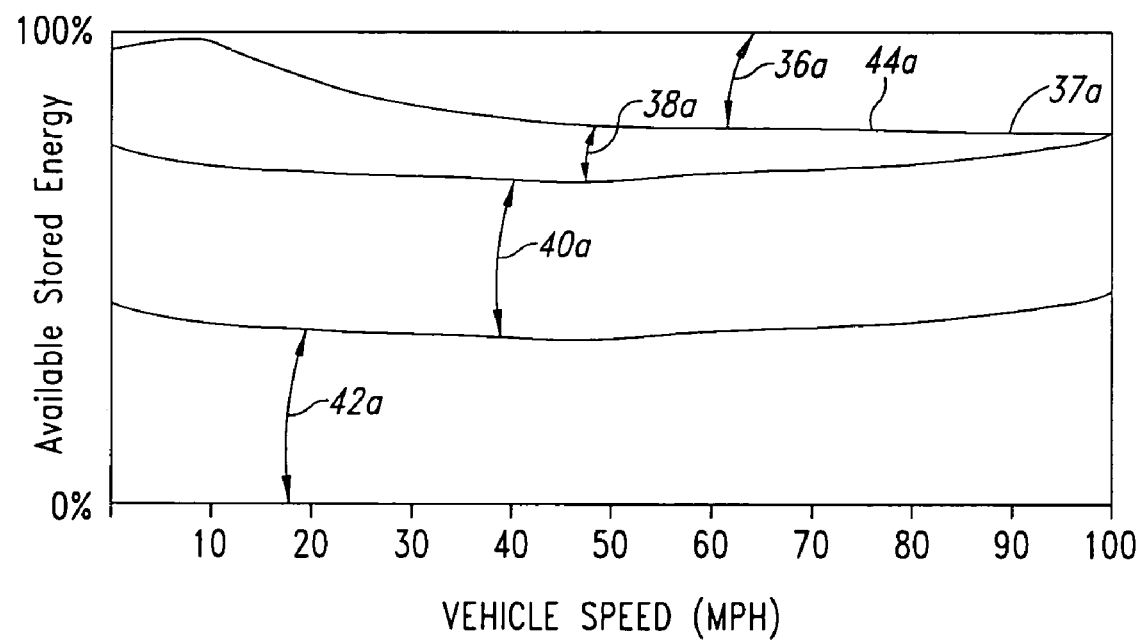
FIG. 6 is a graphic representation for controlling the operation of an engine in a series hybrid vehicle according to another embodiment of the present invention.

Each of the embodiments described above for determining when to use the primary power source, and how to operate the primary power source when it is used, is based on the amount of available stored energy. However, in another embodiment, similar to each of the embodiments discussed above, and illustrated in FIG. 6, rather than basing the determinations of when and how to generate primary power solely on the amount of available stored energy, these determinations are made based on the amount of available stored energy as a function of vehicle speed. For example, to determine whether or not to use primary power to power the secondary power source, both available stored energy and vehicle speed are monitored and, if the amount of available stored energy for a given vehicle speed is above a first selected level of available stored energy (depicted by the points comprising line 37a in FIG. 6), the secondary power source 12 is powered with a portion of the amount of available stored energy and not the primary power source 16. However, if the available stored energy for a given vehicle speed is below the first selected level (again depicted as line 37a in FIG. 6), then the engine 16 is used to generate primary power.

In this embodiment, how the engine 16 is operated when generating an amount of primary power also depends on the amount of available stored energy at a given vehicle speed. As with the embodiments described above, the engine is operated at either a minimum power level, a range of power levels, or a maximum power level, but its operation depends on whether the amount of available stored energy at a given vehicle speed is within a predetermined upper, middle or lower range, ranges 38a, 40a, and 42a, respectively. Since it is more likely that a faster moving vehicle will be braked harder or longer and thus result in a greater opportunity to generate more storable energy than a slower moving vehicle, this embodiment is designed to power the secondary power source with more available stored energy at lower speeds than at higher speeds. Since it is more likely that the vehicle's 10 braking energy at higher speeds will replenish the greater amount of used energy, this strategy (i.e., providing more capacity for storing braking energy at higher vehicle speeds) furthers the vehicle's opportunity to use of "free" energy and provides yet another means of improving the vehicle's 10 overall energy efficiency.

As will be understood by one of ordinary skill in the art, many of the methods may eliminate some steps, include other steps, and/or perform the steps in a different order than illustrated. For example, a predetermined level of available stored energy is a calibration design choice for the restarting of an engine that was shut off when the available stored energy exceeded a predetermined upper range. Further, the various embodiments described above can be combined to provide further embodiments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of operating a series hybrid vehicle having a primary power source comprised of at least one engine and a secondary power source, the method comprising:
   monitoring an amount of available stored energy within an energy storage device;
   operating a first engine at or near a first power level when the amount of available stored energy is within a predetermined upper range of available stored energy, the first power level being a minimum power level for efficient operation of the first engine;
   operating the first engine at or near a second power level when the amount of available stored energy is within a predetermined lower range of available stored energy; and
   operating the first engine within a range of power levels when the amount of available stored energy is within a predetermined middle range of available stored energy.

2. The method according to claim 1 wherein the first power level is defined by a preselected torque level and a preselected engine speed level.

3. The method according to claim 1 wherein the second power level is defined by a preselected torque level and a preselected engine speed level, and the second power level is a maximum power level for efficient operation of the first engine.

4. The method according to claim 1 wherein the range of power levels comprises a number of power levels, each of the number of power levels corresponding to a preselected torque level and a preselected engine speed level, and each of the number of power levels being higher than the first power level and lower than the second power level.

5. The method according to claim 1, further comprising:
   when the amount of available stored energy is within the predetermined middle range of available stored energy, operating the first engine at or near a power level within the range of power levels that is inversely proportional to the amount of available energy within the predetermined middle range of available stored energy.

6. The method according to claim 1 wherein a first selected level of available stored energy is above the predetermined upper range of available stored energy, the method further comprising:
   idling the first engine when the amount of available stored energy is above the first selected level.

7. The method according to claim 6 wherein a second selected level is either 1) equal to the first selected level, or 2) below the first selected level, the method further comprising:
   re-engaging the first engine, following a command to idle the first engine, when the amount of available stored energy is below the second selected level.

8. The method according to claim 6, further comprising:
   turning the first engine off when the amount of available stored energy is above the first selected level and a command to decelerate the vehicle is issued.

9. The method according to claim 6, wherein a second selected level of available stored energy is either 1) equal to the first selected level, or 2) below the first selected level, the method further comprising:
   restarting the first engine, following a command to turn the first engine off, when the amount of available stored energy is below the second selected level.

10. The method according to claim 1, further comprising:
    selectively operating a second engine, together with the first engine, when the amount of available stored energy is within the predetermined middle range of available stored energy; and
    operating the second engine when either 1) the amount of available stored energy is below a selected level within the predetermined middle range of available stored energy, or 2) a command to power the vehicle exceeds a predetermined demand level.

11. The method according to claim 10, further comprising:
    when the second engine is operated, operating the first engine at or near the second power level, the second power level being a predefined maximum power level for efficient operation of the first engine; and
    operating the second engine at or near either 1) a power level within a predefined range of power levels that is inversely proportional to the amount of available stored energy within the predetermined lower range, or 2) a predefined maximum power level for efficient operation of the second engine.

12. The method according to claim 10 wherein the engine is a variable displacement engine, the variable displacement engine having a first number of cylinders defining the first engine and a second number of cylinders defining the second engine.

13. The method according to claim 1, further comprising:
    selectively operating a second engine, together with the first engine, when the amount of available stored energy is within the predetermined lower range of available stored energy; and
    operating the second engine when either 1) the amount of available stored energy is below a selected level within the predetermined lower range of available stored energy, or 2) a command to power the vehicle exceeds a predetermined demand level.

14. The method according to claim 1 wherein the engine can provide at least 60% to 70% of the desired peak acceleration power level for the vehicle.

15. The method according to claim 1 wherein the energy storage device can efficiently sustain a charge rate matching at least 20% to 25% of the engine's maximum rated horsepower.

16. The method according to claim 1 wherein the at least one engine is either 1) an internal combustion engine, or 2) a Stirling engine.

17. The method according to claim 1 wherein the energy storage device is a hydraulic accumulator.

18. The method according to claim 1 wherein the secondary power source is an electric motor.

19. A method of operating a series hybrid vehicle having a primary power source comprised of at least one engine and a secondary power source, the method comprising:
   monitoring an amount of available stored energy within an energy storage device;
   operating an engine at or near a first power level when the amount of available stored energy is within a predetermined upper range of available stored energy;
   operating the engine at or near a second power level when the amount of available stored energy is within a predetermined lower range of available stored energy; and
   operating the engine at or near a power level, within a range of power levels, that is inversely proportional to the amount of available stored energy, when the amount of available stored energy is within a predetermined middle range of available stored energy.

20. A method of operating a series hybrid vehicle having a primary power source comprised of at least one engine and a secondary power source, the method comprising:
   monitoring an amount of available stored energy within an energy storage device;
   operating an engine at or near a first power level when the amount of available stored energy is within a predetermined upper range of available stored energy;
   operating the engine at or near a second power level when the amount of available stored energy is within a predetermined lower range of available stored energy;
   operating the engine within a range of power levels when the amount of available stored energy is within a predetermined middle range of available stored energy; and
   idling the engine when the amount of available stored energy is above a selected level.

21. The method of claim 20, comprising turning the first engine off when the amount of available stored energy is above the selected level and a command to decelerate the vehicle is issued.

22. The method according to claim 1 wherein the energy storage device is an electric battery.

23. The method according to claim 1 wherein the energy storage device is either 1) an ultracapacitor, or 2) a flywheel.

24. The method according to claim 1 wherein the secondary power source is a hydraulic motor.

* * * * *